US011570395B2

(12) United States Patent
Katsumata

(10) Patent No.: US 11,570,395 B2
(45) Date of Patent: Jan. 31, 2023

(54) RECORDING AND REPRODUCING APPARATUS AND METHOD OF CONTROLLING RECORDING AND REPRODUCING APPARATUS

(71) Applicant: CANON KABUSHIKI KAISHA, Tokyo (JP)

(72) Inventor: Kohei Katsumata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 17/225,606

(22) Filed: Apr. 8, 2021

(65) Prior Publication Data
US 2021/0329192 A1     Oct. 21, 2021

(30) Foreign Application Priority Data

Apr. 15, 2020    (JP) .............................. JP2020-072881

(51) Int. Cl.
*H04N 5/77*      (2006.01)
*H04N 5/232*     (2006.01)

(52) U.S. Cl.
CPC ......... *H04N 5/772* (2013.01); *H04N 5/23216* (2013.01); *H04N 5/23245* (2013.01)

(58) Field of Classification Search
CPC . H04N 5/772; H04N 5/23216; H04N 5/23245
See application file for complete search history.

(56) References Cited

U.S. PATENT DOCUMENTS

| | | | | |
|---|---|---|---|---|
| 2001/0022620 A1* | 9/2001 | Niwa | ...................... | H04N 5/772 358/906 |
| 2005/0259163 A1* | 11/2005 | Tsujii | ..................... | H04N 5/772 386/E5.072 |
| 2006/0256203 A1* | 11/2006 | Honma | .............. | H04N 5/23245 348/E5.042 |
| 2007/0053565 A1* | 3/2007 | Aridome | ................ | H04N 5/772 382/128 |
| 2014/0232924 A1* | 8/2014 | Ishitsuka | .......... | H04N 5/232933 348/333.12 |
| 2014/0241697 A1* | 8/2014 | Yoneda | ................ | G11B 27/329 386/248 |
| 2015/0036995 A1* | 2/2015 | Sekiguchi | .............. | H04N 5/907 386/224 |

FOREIGN PATENT DOCUMENTS

JP           2010259122 A     11/2010

* cited by examiner

*Primary Examiner* — Sunghyoun Park
(74) *Attorney, Agent, or Firm* — Canon U.S.A., Inc. IP Division

(57) ABSTRACT

An apparatus includes a first writing unit configured to write data to a recording medium in a first unit, a second writing unit configured to write data to the recording medium in a second unit smaller than the first unit, a reading unit configured to read data from the recording medium, and a control unit configured to perform control, in response to an instruction of reading data from the recording medium during writing data by the first writing unit, to stop writing data by the first writing unit, and then to read data from the recording medium by the reading unit, and, in response to completion of reading data from the recording medium, to write data in the second unit by the second writing unit.

18 Claims, 4 Drawing Sheets

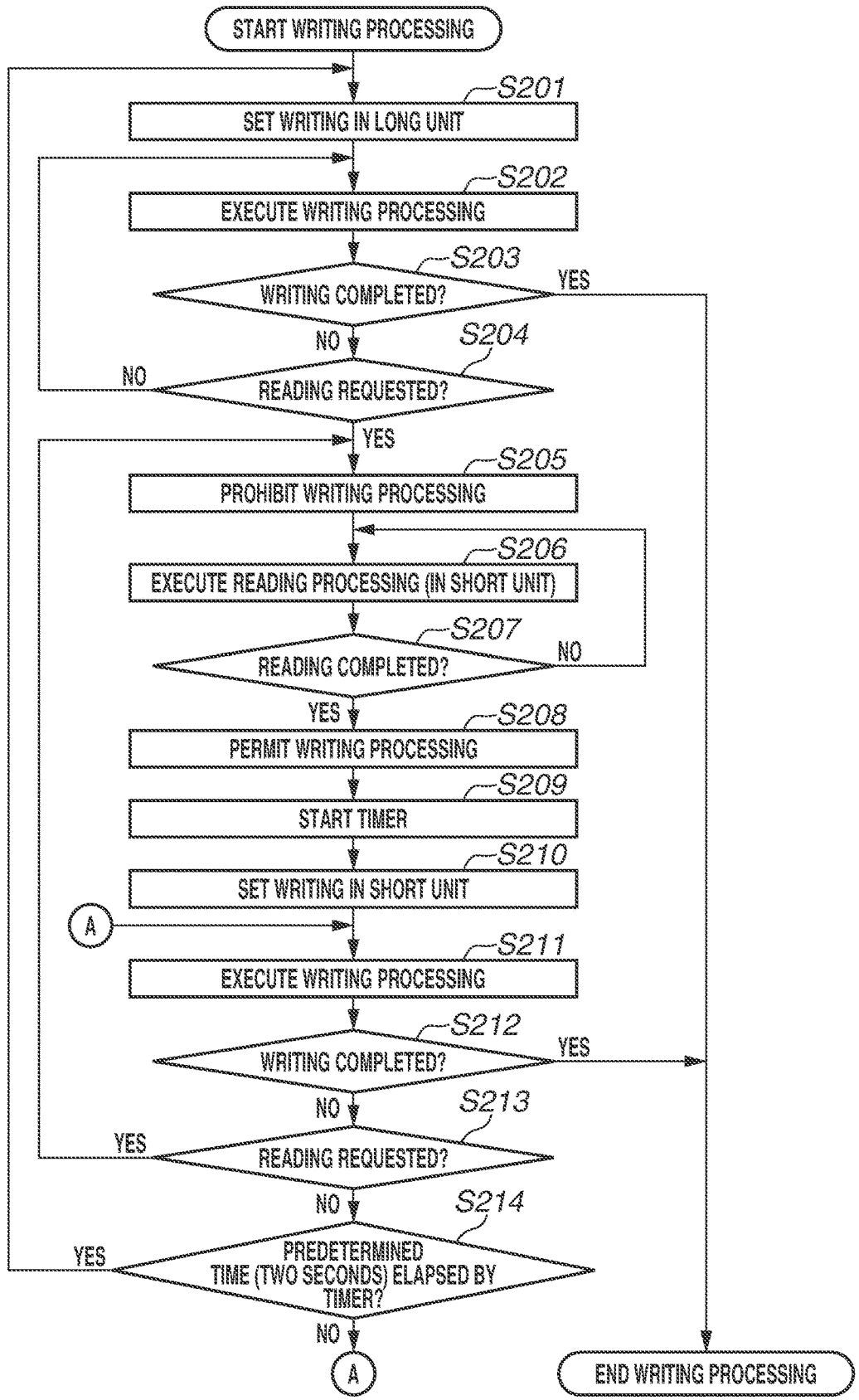

TIMING CHART 1

TIMING CHART 2

RECORDING AND REPRODUCING APPARATUS AND METHOD OF CONTROLLING RECORDING AND REPRODUCING APPARATUS

BACKGROUND OF THE DISCLOSURE

Field of the Disclosure

The aspect of the embodiments relates to a data processing method executed in a recording and reproducing apparatus that can read and write data from and to a recording medium.

Description of the Related Art

A conventional general image capturing and reproducing apparatus is provided with an input/output device to write and read data to and from a medium to record a captured image and reproduce the recorded image. A central processing unit (CPU) for controlling the input/output device includes a real-time operating system (RTOS) and performs control in a multitasking manner in which multiple tasks are apparently executed at the same time. When different tasks try to access an input/output device performing control in a multitasking, a task accessing the input/output device the earliest uses the input/output device and occupies it until the processing is completed. A task that tries to access the input/output device later performs input/output processing after the input/output device completes the input/output processing of the task that has accessed it earlier and becomes an idle state.

In the above-described method of accessing the input/output device, even if a task with high urgency requests access to the input/output device, the highly urgent task has to wait until the earlier-accessing task completes its access to the input/output device. This causes an issue that processing which a user wants to give priority to is kept waiting.

In Japanese Patent Application Laid-Open No. 2010-259122, when an execution of an input task is instructed during execution of an output task in a first unit of processing, the unit of processing on one task with the higher priority of the two tasks and the unit of processing on the other with the lower priority are set to the first unit of processing and a second unit of processing, which is smaller than the first unit of processing, respectively. That improves the overall efficiency of the processing.

According to Japanese Patent Application Laid-Open No. 2010-259122, although the higher priority task with the larger unit of processing allocated thereto contributes to the overall efficiency, the higher priority task and the lower priority task are alternately processed. As a result, it takes time to complete the processing of both tasks. In addition, according to Japanese Patent Application Laid-Open No. 2010-259122, if an execution of an input task with higher priority than that of the output task is instructed during the execution of an output task in a long unit of processing, the unit of processing on the output task is shortened, and the unit of processing on the input task is lengthened. However, as the output task is executed in the long unit of processing before the execution of the input task is instructed, the processing of the input task cannot be started without waiting for completion of the processing of the output task in the long unit of processing.

SUMMARY OF THE DISCLOSURE

An apparatus includes a first writing unit configured to write data to a recording medium in a first unit, a second writing unit configured to write data to the recording medium in a second unit smaller than the first unit, a reading unit configured to read data from the recording medium, and a control unit configured to perform control, in response to an instruction of reading data from the recording medium during writing data by the first writing unit, to stop writing data by the first writing unit, and then to read data from the recording medium by the reading unit, and, in response to completion of reading data from the recording medium, to write data in the second unit by the second writing unit.

Further features of the disclosure will become apparent from the following description of exemplary embodiments with reference to the attached drawings.

BRIEF DESCRIPTION OF THE DRAWINGS

FIG. 2 is a flowchart illustrating writing processing.

DESCRIPTION OF THE EMBODIMENTS

Figure 1:
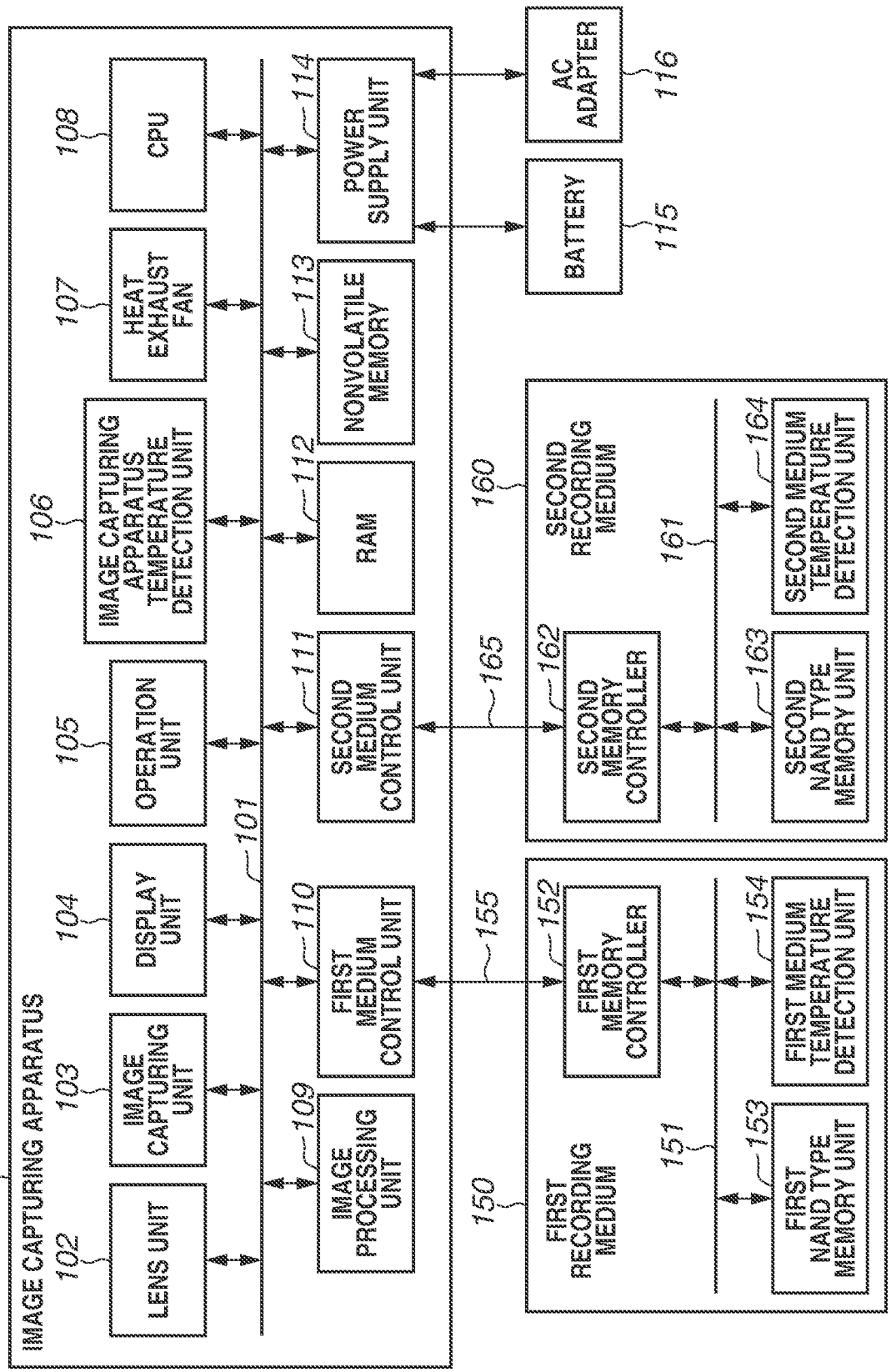
FIG. 1 schematically illustrates a configuration of an image capturing apparatus.

Exemplary embodiments of the disclosure will be described in detail below with reference to the attached drawings. It should be understood that the following exemplary embodiments are not intended to restrict the disclosure according to the claims. A plurality of features is described in the exemplary embodiments, but not all of the plurality of features are used to the solution according to the disclosure. Further, any combination of the plurality of features may be used. In addition, the same or similar configurations are denoted by the same reference numerals in the attached drawings, and redundant description thereof will be omitted.

<Configuration of Image Capturing Apparatus>

FIG. 1 schematically illustrates a configuration of an image capturing apparatus 100 as an example of a recording and reproducing apparatus.

In FIG. 1, an image capturing apparatus internal bus 101 is connected to a lens unit 102, an image capturing unit 103, a display unit 104, an operation unit 105, an image capturing apparatus temperature detection unit 106, a heat exhaust fan 107, and a central processing unit (CPU) 108. The image capturing apparatus internal bus 101 is further connected to an image processing unit 109, a first medium control unit 110, a second medium control unit 111, a random access memory (RAM) 112, a nonvolatile memory 113, and a power supply unit 114. Each unit connected to the image capturing apparatus internal bus 101 is configured to be able to exchange data with one another via the image capturing apparatus internal bus 101.

The CPU 108 follows programs stored, for example, in the nonvolatile memory 113 to control each unit in the image capturing apparatus 100 using the RAM 112 as a work memory.

The nonvolatile memory 113 stores image data, audio data, other data, and various programs for the CPU 108 to operate on. The nonvolatile memory 113 is configured of, for example, a hard disk (HD) or a read-only memory (ROM).

The image processing unit 109 performs various types of image processing based on control by the CPU 108 on image data stored in the nonvolatile memory 113 and the RAM 112 and image data obtained by an object optical image incident through the lens unit 102 being captured by the image capturing unit 103. The image processing performed by the image processing unit 109 includes analog to digital (A/D) conversion processing, digital to analog (D/A) conversion processing, and encoding processing, compression processing, decoding processing, magnification/reduction processing (resizing), noise reduction processing, and color conversion processing on the image data. The image processing unit 109 may be configured with a dedicated circuit block for performing particular image processing. The CPU 108 can follow programs to perform image processing without using the image processing unit 109 depending on a type of the image processing.

The display unit 104 displays images and graphical user interface (GUI) screens configuring GUIs based on the control by the CPU 108. The CPU 108 follows programs to generate display control signals and generates video signals to be displayed on the display unit 104 to control individual units in the image capturing apparatus 100 to output the video signals to the display unit 104. The display unit 104 displays video based on the output video signals. The configuration of the image capturing apparatus 100 itself may include an interface for outputting video signals to be displayed on the display unit 104, and the display unit 104 may be an external monitor (such as a television).

The operation unit 105 is an input device for receiving user operations and includes a touch panel, a power supply button, a shutter button, a mode switching dial, a cross key, an operation dial, and a menu button. The touch panel is an input device that forms in a surface shape, superimposed on the display unit 104, to output coordinate information corresponding to a touched position.

The power supply unit 114 is power supply selection circuitry including a power supply input terminal to which a battery 115 and an alternating current (AC) adapter 116 are mountable, a comparator, and a load switch, and gives priority to select the power supply with the higher voltage of the two or the AC adapter 116.

The power supply unit 114 further includes a battery interface for connecting the image capturing apparatus 100 and the battery 115. The battery interface includes a power supply, a ground, a communication terminal to a microcomputer (not illustrated), and a temperature detection unit (not illustrated) included in the battery 115. The power supply unit 114 further includes an AC adapter interface for connecting the image capturing apparatus 100 and the AC adapter 116. The AC adapter interface includes a power supply, a ground, and a detection unit for detecting the AC adapter 116.

The power supply unit 114 can notify the CPU 108 of information about the battery 115 and the AC adapter 116 via the image capturing apparatus internal bus 101. The power supply unit 114 regulates a voltage from the selected power supply using a direct current to direct current (DC/DC) converter and a series regulator, which are not illustrated, and supplies the power to each unit included in the image capturing apparatus 100. Further, the power supply unit 114 performs A/D conversion on respective voltages of the mounted battery 115 and AC adapter 116 and notifies the CPU 108 of the respective voltage values.

The image capturing unit 103 is an image capturing device such as a charge coupled device (CCD) sensor and a complementary metal oxide semiconductor (CMOS) sensor. The lens unit 102 includes a zoom lens, a focus lens, a shutter, an aperture, a ranging unit, and an A/D converter.

The image capturing unit 103 can capture still and moving images. The image data of a captured image is transmitted to the image processing unit 109, subjected to various types of processing, and then recorded on a first recording medium 150 or a second recording medium 160 in a still image file or a moving image file.

The heat exhaust fan 107 is a cooling fan. The temperature inside the image capturing apparatus 100 is detected by the image capturing apparatus temperature detection unit 106 and notified to the CPU 108. The CPU 108 controls the fan rotation rate of the heat exhaust fan 107 according to the detected temperature to control the temperature.

The image capturing apparatus 100 can access the first recording medium 150 via the first medium control unit 110 and a first medium interface 155 and record on the first recording medium 150 the data of the still image and the moving image subjected to the image processing, encoding processing, and compression processing by the image processing unit 109. Further, the image capturing apparatus 100 can read the data of the still image and the moving image recorded on the first recording medium 150 via the first medium control unit 110 and the first medium interface 155. The image capturing apparatus 100 displays on the display unit 104 the image of the read data subjected to decoding processing by the image processing unit 109.

The first recording medium 150 according to the present exemplary embodiment is attachable to and detachable from the image capturing apparatus 100 and is a memory card conforming to the CFexpress standard.

The first medium control unit 110 can communicate control commands with a first memory controller 152 via the first medium interface 155. The control commands include commands for obtaining vendor information, temperature information, and information about the number of writing times in addition to commands for recording and reproducing data.

The first recording medium 150 includes the first memory controller 152, a first NOT AND (NAND) type memory unit 153, and a first medium temperature detection unit 154, each of which is connected to one another via a first recording medium internal bus 151.

The first memory controller 152 records the data of the still image and the moving image transferred from the first medium control unit 110 on the first NAND type memory unit 153. In the recording, the first memory controller 152 controls writing to cache areas of the first NAND type memory unit 153 and moving the data to main data areas. Further, the first memory controller 152 can perform garbage collection for creating a free space by moving and organizing fragmented pieces of data in the first NAND type memory unit 153.

Furthermore, the first memory controller 152 obtains data on the temperature of the first NAND type memory unit 153 detected by the first medium temperature detection unit 154. The first memory controller 152 performs control of a clock frequency, prohibition and permission of access, and an access speed with respect to the first NAND type memory unit 153 according to the temperature.

The second recording medium 160 is connected to the image capturing apparatus 100 via the second medium control unit 111 and a second medium interface 165 and has a configuration and functions similar to those of the first recording medium 150. A second memory controller 162, a second NAND type memory unit 163, and a second medium temperature detection unit 164 correspond to the first memory controller 152, the first NAND type memory unit 153, and the first medium temperature detection unit 154, respectively. The second memory controller 162, the second NAND type memory unit 163, and the second medium temperature detection unit 164 are connected to one another via a second recording medium internal bus 161.

<Still Image Capturing Processing>

When a still image capturing mode is selected using the mode switching dial by a user operation, the image capturing apparatus 100 operates in the still image capturing mode. In the still image capturing mode, the CPU 108 performs control to cause the image capturing unit 103 to capture a still image in response to an operation performed on the shutter button and to transmit the data of the captured still image to the image processing unit 109 to perform various types of processing thereon. Then, the CPU 108 performs recording control to generate a still image file from the image data subjected to the image processing and to record the still image file on the first recording medium 150 or the second recording medium 160 via the first medium control unit 110 or the second medium control unit 111.

<Moving Image Capturing Processing>

When a moving image capturing mode is selected using the mode switching dial by a user operation, the image capturing apparatus 100 operates in the moving image capturing mode. In the moving image capturing mode, the CPU 108 starts to cause the image capturing unit 103 to capture a moving image in response to an operation on the shutter button or a moving image capturing button and to keep capturing the moving image until the shutter button or the moving image capturing button is operated again. The CPU 108 performs recording control to transmit the data of the captured moving image to the image processing unit 109 to perform various types of processing thereon, to generate a moving image file from the image data subjected to the image processing, and to record the moving image file on the recording medium (150 or 160) via a medium control unit (110 or 111).

When a reproduction mode button is operated by the user operation, the image capturing apparatus 100 shifts in a reproduction mode. In the reproduction mode, the CPU 108 performs reproduction control to read the image file (the still image file or the moving image file) recorded on the first recording medium 150 or the second recording medium 160 via the first medium control unit 110 or the second medium control unit 111 and then to display the image file on the display unit 104. For the still image file in the reproduction mode, the CPU 108 displays the image data of the still image file on the display unit 104. For the moving image file, the CPU 108 first reads the representative image or the frame image of the first frame of the moving image, displays the read image on the display unit 104, and then performs moving image reproduction for continuously reproducing a plurality of frame images of the moving image file in response to an input of an instruction to start reproduction of the moving image by the user.

<Processing Flow of Image Capturing Apparatus 100>

Figure 4:
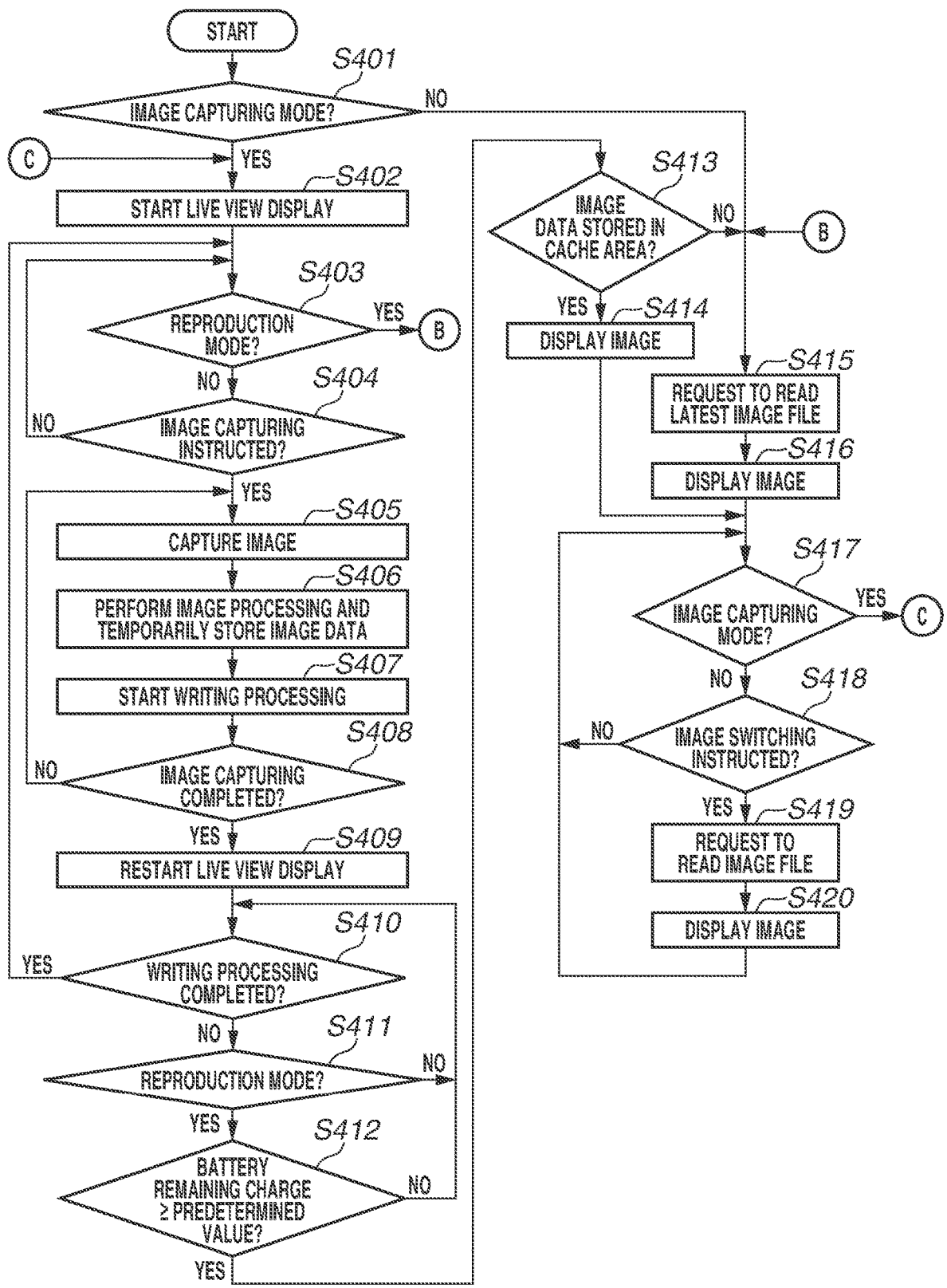
FIG. 4 is a flowchart illustrating processing in the image capturing apparatus.

A basic processing procedure of the image capturing apparatus 100 will be described with reference to a flowchart in FIG. 4. The processing in the flowchart is executed by the CPU 108 reading a program from the nonvolatile memory 113 and controlling various calculations and each unit based on the read program in response to turning ON of the power supply of the image capturing apparatus 100 by an operation on the power supply button on the operation unit 105. The processing in the present flowchart is terminated in response to turning OFF of the power supply by an operation on the power supply button on the operation unit 105. In the following description, an image is recorded on the first recording medium 150, but an image may be recorded on the second recording medium 160 according to a setting by the user.

First, in step S401, the CPU 108 determines whether the operation mode of the image capturing apparatus 100 is an image capturing mode or the reproduction mode. If it is the image capturing mode (YES in step S401), the processing proceeds to step S402, and if it is the reproduction mode (NO in step S401), the processing proceeds to step S415.

In the image capturing mode, in step S402, the CPU 108 starts a live view display. The live view display is performed in such a manner that the CPU 108 obtains image data of an image captured by the image capturing unit 103, generates image data for display from the image data obtained by the image processing unit 109, and successively displays the image data on the display unit 104.

During the live view display, the CPU 108 monitors an operation on the operation unit 105 by the user. In step S403, the CPU 108 determines whether a switching operation to the reproduction mode is performed by an operation on the mode switching dial of the operation unit 105. If a switching operation to the reproduction mode is performed (YES in step S403), the processing proceeds to step S415. In step S404, the CPU 108 determines whether an operation for instructing image capturing such as an operation on the shutter button and an operation on the moving image capturing button of the operation unit 105 is performed. If the image capturing is instructed (YES in step S404), the processing proceeds to step S405. Otherwise (NO in step S404), the processing returns to step S403, and the CPU 108 continues monitoring of an operation.

If image capturing is instructed, in step S405, the CPU 108 executes capturing of an image. The CPU 108 here causes the image capturing unit 103 to capture an image based on a set image capturing condition and obtains the image data.

In step S406, the CPU 108 causes the image processing unit 109 to perform various types of image processing such as development processing and image correction processing on the image data obtained by image capturing in step S405 and temporarily stores the image data subjected to the image processing in the cache area of the RAM 112. The cache area has a predetermined size and temporarily stores the data that has not yet recorded on the first recording medium 150. The cache area is used as a ring buffer. The image data to be newly stored is stored in the area next to the previous image data, and an area in which the image data that has been recorded on the first recording medium 150 is stored is overwritten for use. Thus, the image data will have been stored in the cache area until the area is overwritten.

Next, in step S407, the CPU 108 reads the image data stored in the cache area of the RAM 112 and starts writing processing to record the image data on the first recording medium 150. Before the writing processing, the CPU 108 causes the image processing unit 109 to perform compression coding processing (encoding) corresponding to the image capturing mode and the recording format on the image data read from the cache area and records the compressed image data on the first recording medium 150 in an image file. The writing processing will be described in detail below with reference to FIG. 2. The writing processing is executed until the image capturing is completed, and all pieces of image data temporarily stored in the cache area are recorded on the recording medium. For the still image capturing, compression processing for still images is performed on the image data and one still image file for each piece of image data is recorded. For the moving image capturing, compression processing for moving images is performed on each piece of image data and the pieces of image data up to the end of the image capturing are recorded as one moving image file.

Next, in step S408, the CPU 108 determines whether the image capturing is completed. In the still image capturing, the CPU 108 determines that the image capturing is not completed but continued with a continuous operation on the shutter button, or determines that the image capturing is completed with an operation on the shutter button stopped. In the moving image capturing, the CPU 108 determines that the image capturing is completed if the moving image capturing button is operated again. In addition, if a free space that can store data in the cache area (the areas in which image data that has been recorded on the recording medium is stored are also regarded as the free space) has a predetermined size (for example, a size used to store next image data) or smaller, the CPU 108 determines that the image capturing is completed. In step S408, if it is determined that the image capturing is completed (YES in step S408), the processing proceeds to step S409. If it is determined that the image capturing is not completed but is continued (NO in step S408), the processing proceeds to step S405, and the CPU 108 continues the image capturing operation and proceeds to the image capturing processing on the next image data. In other words, the processing in steps S405 to S408 is repeated until it is determined that the image capturing is completed. However, as for the processing in step S407, the writing processing is started at the time of capturing the first image data, so that the processing in step S407 is skipped in the image capturing of the second and subsequent image data.

In some cases, the image processing in step S406 takes time. In such cases, after the image data that has not been subjected to the image processing is stored in a buffer area in the RAM 112 separate from the cache area, the image processing in step S406, temporary storing processing of the image data subjected to the image processing, and the writing processing started in step S407 may be executed in parallel with the image capturing in step S405.

If it is determined that the image capturing is completed (YES in step S408), in step S409, the CPU 108 performs the processing similar to that in step S402 to restart the live view display. The CPU 108 may perform the live view display during the image capturing and recording processing in steps S405 to S407. Further, for the still image capturing, the CPU 108 may perform preview display for the user to confirm the captured image based on the image subjected to the image processing.

Even if it is determined that the image capturing is completed, the image processing and the writing processing on the image data are continued until the processing on all the pieces of image data is completed.

Next, in step S410, the CPU 108 determines whether the writing processing is completed on all the pieces of image data stored in the cache area. If the writing processing is completed (YES in step S410), the image capturing processing and the recording processing are all completed, so that the processing returns to step S403. At that time, as the writing processing is completed, the CPU 108 performs processing for erasing the image data temporarily stored in the cache area. If the writing processing is not completed (NO in step S410), the processing proceeds to step S411.

In step S411, the CPU 108 determines whether a switching operation to the reproduction mode is performed by an operation on the mode switching dial on the operation unit 105. If no switching operation to the reproduction mode is performed (NO in step S411), the processing returns to step S410, and the CPU 108 repeats the determination in steps S410 and S411 until the writing processing is completed. If a switching operation to the reproduction mode is performed (YES in step S411), the processing proceeds to step S412.

In step S412, the CPU 108 obtains information about the battery remaining charge of the battery 115 from the power supply unit 114 and determines whether the battery remaining charge is a predetermined value or more. If the battery remaining charge is not the predetermined value or more and is low (almost no remaining charge) (NO in step S412), the CPU 108 returns the processing to step S410 without shifting in the reproduction mode. If the CPU 108 shifts in the reproduction mode with a low battery remaining charge, the image data stored in the cache area may not be recorded on the recording medium, so that the CPU 108 does not shift to the reproduction mode. Alternatively, the processing may proceed to step S413 or S415 in response to the completion of the writing processing, and the CPU 108 shifts in the reproduction mode.

If the CPU 108 shifts in the reproduction mode before the completion of the writing processing, in step S413, the CPU 108 determines whether the image data is temporarily stored in the cache area. Although the image data is typically stored in the cache area, if no image has been subjected to the image processing, with no image data stored in the cache area (NO in step S413), the processing proceeds to step S415.

If image data is stored in the cache area (YES in step S413), in step S414, the CPU 108 reads the latest piece of image data of the pieces of image data stored in the cache area and displays the latest one on the display unit 104.

In step S415, the CPU 108 requests the first medium control unit 110 to read the latest image file and reads the latest image file from the first recording medium 150 via the first medium control unit 110. The CPU 108 may read the entire latest image file or may read only image data to be displayed in the image file.

Next, in step S416, the CPU 108 causes the image processing unit 109 to perform expansion decoding processing (decoding processing) on the image data of the image file read based on the reading request in step S415 and displays the image data on the display unit 104.

Next, in step S417, the CPU 108 determines whether the switching operation to the image capturing mode is performed by an operation on the mode switching dial on the operation unit 105. If a switching operation to the image capturing mode is performed (YES in step S417), the processing proceeds to step S402. If no switching operation to the image capturing mode is performed (NO in step S417), the processing proceeds to step S418.

In step S418, the CPU 108 determines whether an image switching instruction is input by operations on right/left keys or others on the operation unit 105. If an image switching instruction is input (YES in step S418), the processing proceeds to step S419. Otherwise (NO in step S418), the processing returns to step S417, and the CPU 108 monitors an operation by the user.

In step S419, the CPU 108 requests the first medium control unit 110 to read an image file of an image to be displayed next from the first recording medium 150. The first medium control unit 110 reads the image file from the first recording medium 150 in response to the reading request.

Then, in step S420, the CPU 108 causes the image processing unit 109 to perform the expansion decoding processing (the decoding processing) on the image data of the image file read from the first recording medium 150 based on the reading request in step S419 and displays the image data on the display unit 104. Then, the processing returns to step S417.

If an image switching instruction is input in step S418 before the completion of the writing processing and image data of a reproduction target (a display target) is stored in the cache area, the CPU 108 may read the image data from the cache area and displays the image data on the display unit 104 without requesting reading of the image data (the image file) from the first recording medium 150.

As described above, the image capturing apparatus 100 according to the present exemplary embodiment can shift in the reproduction mode if a reproduction button is pressed before the completion of the still image capturing (particularly, continuous imaging of still images) in the image capturing mode and the recording processing (the writing processing) of the image captured in the moving image capturing on the recording medium. Conventionally, if the reproduction button is pressed during capturing and recording of a still image or a moving image, the image capturing apparatus displays "busy" or the like. The image capturing apparatus will not shift in the reproduction mode until the recording processing is completed or the image processing (particularly, the development processing) on the captured image is completed, the user being kept waiting. This is because the encoding processing cannot be executed in parallel with the decoding processing on the image, thus the decoding processing being kept waiting during the encoding processing.

In contrast, the image capturing apparatus 100 according to the present exemplary embodiment can execute the encoding processing and the decoding processing on the image in parallel, and can minimize the display time of a "busy" display, sifting in the reproduction mode during the recording (the writing processing) of image data in the image capturing mode. In other words, if the image file is read in step S415 before the completion of the writing processing, or if the image switching instruction is input in step S418 before the completion of the writing processing and then the image file is read in step S419, the writing processing to the first recording medium 150 and the reading processing from the first recording medium 150 will be both executed.

Writing control in the recording processing in the image capturing mode and reading control in the image reproduction processing in the reproduction mode will conflict with each other in the single recording medium. When a command to perform writing processing or reading processing is issued to the recording medium, the command once issued cannot be canceled.

There are a method of switching between writing processing and reading processing in units of images and a method of switching between them in units of writing/reading, as controlling methods in cases where the reading processing and the writing processing conflict with each other. However, with a large unit, it will take time before a next processing command becomes allowed, deteriorating the responsiveness. The image capturing apparatus 100 according to the present exemplary embodiment performs the following writing processing to improve the responsiveness.

<Detail Flow of Writing Processing>

A detailed processing procedure of the writing processing to be started in step S407 will be described with reference to a flowchart in FIG. 2. The processing is executed by the CPU 108 reading a program from the nonvolatile memory 113 and controlling various types of calculations and each unit based on the read program.

Upon a start of writing processing, the CPU 108 sets writing in a long unit as a unit for writing data to the first recording medium 150 in step S201 first.

In this step, a writing size is set to 8 MB as the writing unit. If a writing command is once issued to the recording unit, the command cannot be canceled later. A command for writing or reading in a short unit to the recording medium could shorten an absolute time to shorten a waiting period up to a next command, improving the responsiveness. Setting a short unit shortens a waiting period up to a next command; however, efficiency to access the recording medium is deteriorated. A longer reading/writing unit enables efficient access to the recording medium, leading to a high reading/writing speed.

Since no reading processing is requested at the time of the start of the writing processing, the writing unit is set to a long unit (8 MB in the present exemplary embodiment), providing a high speed writing.

Next, in step S202, the first medium control unit 110 executes the writing processing of data to the first recording medium 150 in the unit set in step S201. For example, for a secure digital (SD) card as the recording medium, a command such as CMD24 or CMD25 is issued. For a CFexpress card as the recording media, an operation command based on Non-Volatile Memory Express (NVMe) is issued. As described above, the first medium control unit 110 issues to the first recording medium 150 a writing command of writing target data and executes the writing processing of the data in the writing unit set in step S201.

Next, in step S203, the CPU 108 determines whether the writing processing of the recording target data is all completed. The writing processing is performed while the image is divided by the writing unit; some residual data will be left if an image is generated in the writing unit or greater. That is why the described determination is performed. In addition, with a plurality of still image files recorded in continuous imaging of still images, or with a plurality of frames of image data of a moving image recorded as the moving image file in the moving image capturing, it is determined whether the writing processing is completed on all the data as described above, because of recording of a plurality of pieces of image data.

In step S203, if it is determined that the writing processing of the recording target data is all completed (YES in step S203), the writing processing is terminated. If it is determined that the writing processing is not completed with some remaining writing target data (NO in step S203), the processing proceeds to step S204.

In step S204, the CPU 108 determines whether reading processing to the first recording medium 150 is requested (in step S415 or S419). This determination enables a determination whether the reading processing is to be performed during the writing processing to the recording medium. If no reading processing is requested (NO in step S204), the processing returns to step S202, and the writing processing of data every 8 MB is continuously executed.

If reading processing is requested (YES in step S204), in step S205, the CPU 108 temporarily prohibits the writing processing to the first recording medium 150 until the reading processing is completed. As an execution method for prohibiting the writing processing, task control of the writing processing may be locked by exclusive control such as semaphore, and a wait may be set in a polling form while setting a waiting time. Next, in step S206, the first medium control unit 110 issues a reading command corresponding to the reading request (in step S415 or S419) to the first recording medium 150 and executes the reading processing. The reading processing is performed in a short reading unit. According to the present exemplary embodiment, the reading command is issued by the 128 KB to execute the reading processing. In step S207, the CPU 108 determines whether the reading of data as a reading target based on the reading request (in step S415 or S419) is completed. If the reading processing is not completed (NO in stem S207), the processing in step S206 is repeated. In other words, the reading processing is performed until the reading processing of the data requested to be read is completed. The prioritized reading processing improves the responsiveness with respect to a definite indication of the user's intention to reproduce the image, providing a feeling of comfort to the user.

In step S207, if it is determined that the reading processing is completed (YES in step S207), the processing proceeds to step S208. In step S208, since the reading processing based on the reading request is all completed, the CPU 108 sets the writing processing temporarily prohibited in step S205 to permission. In step S209, the CPU 108 causes a timer to start counting. In step S210, the CPU 108 sets the unit for writing data to the first recording medium 150 to a short unit (512 KB according to the present exemplary embodiment). Then, in step S211, the first medium control unit 110 executes the writing processing in the short unit set in step S210.

As described above, in the writing processing according to the present exemplary embodiment, if the writing processing in the long unit set in step S201 is executed after the writing processing is permitted in step S208 after the completion of the reading processing, it will take some time to start the reading processing upon a request of next reading processing, deteriorating the responsiveness is deteriorated. In some cases, an image switching operation (image forwarding and image rewinding) may be performed continuously after shifting in the reproduction mode. In such cases, if the writing processing in the long unit is performed immediately after the completion of the reading processing, the reading processing of a next image will start late, deteriorating the responsiveness. The writing in the short unit set in step S210 and then the writing processing performed in the short unit in step S211 therefore prevents the start of reading processing upon a next reading processing request from being late, not allowing deterioration in the responsiveness.

After the writing processing in the short unit in step S211, in step S212, the CPU 108 determines whether the writing processing of the recording target data is all completed as with the processing in step S203. In step S212, if it is determined that the writing processing is completed (YES in step S212), the writing processing is terminated. Otherwise (NO in step S212), the processing proceeds to step S213. In step S213, the CPU 108 determines whether reading processing on the first recording medium 150 is requested (in step S415 or S419) as with the processing in step S204. In step S213, if it is determined that reading processing is requested (YES in step S213), the processing proceeds to step S205, and the CPU 108 executes the processing in step S205 and the subsequent steps. In step S213, if it is determined that no reading processing is requested (NO in step S213), the processing proceeds to step S214. In step S214, the CPU 108 determines whether the counting by the timer started in step S209 exceeds a predetermined time (two seconds according to the present exemplary embodiment). In other words, the CPU 108 determines whether the predetermined time (two seconds) has elapsed from the start of the writing processing in the short unit after the completion of the reading processing. In step S214, if it is determined that the predetermined time has elapsed (YES in step S213), the processing proceeds to step S201. In other words, if the predetermined time has elapsed, the CPU 108 executes the writing processing in the long unit to improve a writing speed. In step S214, if it is determined that the predetermined time has not elapsed (NO in step S213), the processing proceeds to step S211, and the CPU 108 continues the writing processing in the short unit. Within the predetermined time after the completion of the reading processing, the CPU 108 performs the writing processing in the short unit to improve the responsiveness of the reading processing in consideration of a possible reading request of a further next image.

<Description of Sequence Using Timing Chart>

Next, execution timings of writing processing and reading processing according to the present exemplary embodiment will be described with reference to timing charts in FIGS. 3A and 3B.

Figure 3A:
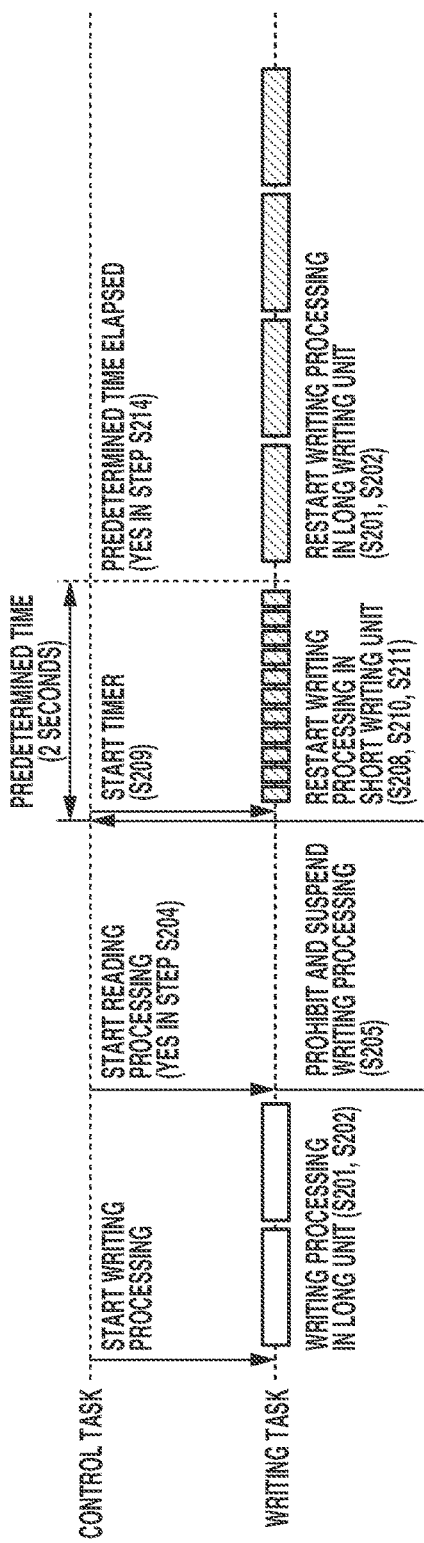
FIGS. 3A and 3B illustrate timing charts of writing processing and reading processing.

FIG. 3A is a timing chart (a timing chart 1) in a case where a reading processing request is issued before the completion of writing processing, after that, the writing processing is restarted, and during the writing processing, no reading request is issued.

Figure 3B:
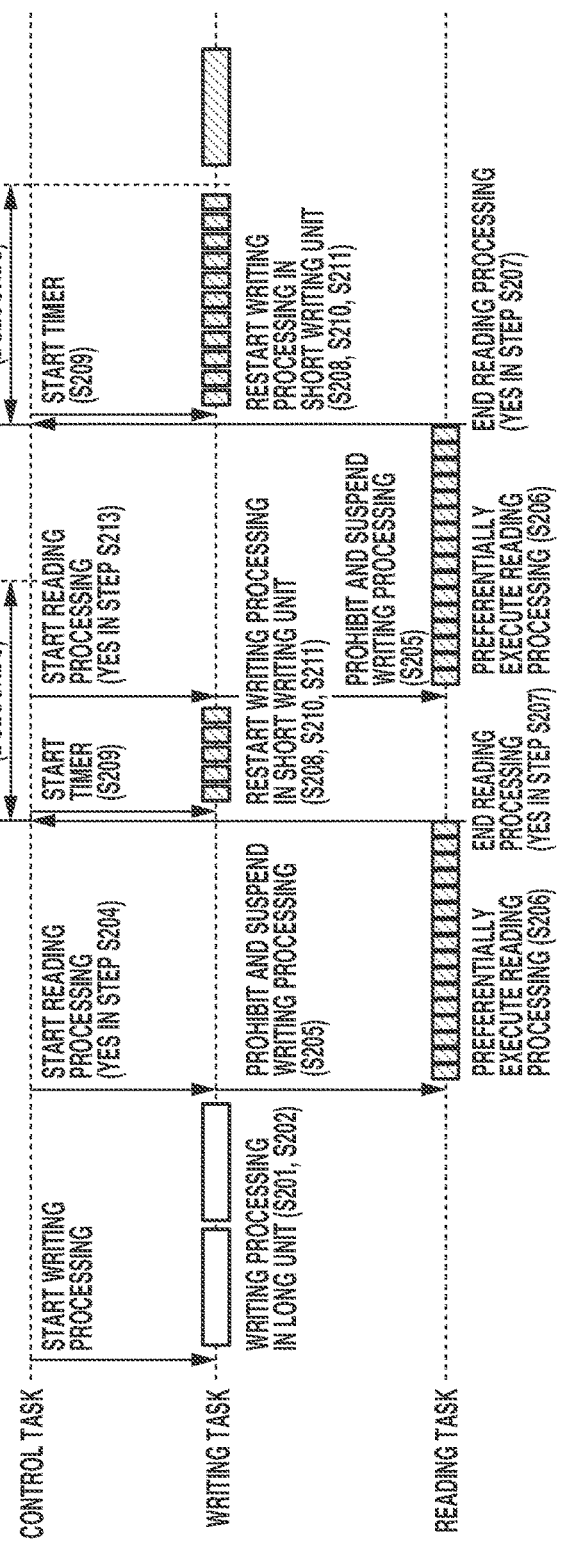

FIG. 3B is a timing chart (a timing chart 2) in a case where a reading processing request is issued before the completion of writing processing, after that, the writing processing is restarted, and during the writing processing, a reading request is issued.

These timing charts include a writing task regarding the writing processing, a reading task regarding the reading processing, and a control task for controlling the writing task and the reading task, which will be described.

The timing chart in FIG. 3A will be described.

First, if the CPU 108 starts the writing processing in step S407, the writing processing in the long unit is executed in steps S201 and S202. Then, if reading processing is requested before the completion of the writing processing (YES in step S204), the reading processing is started. When the reading processing is started, in step S205, the writing processing is prohibited and suspended, and the reading processing is executed in step S206. When the reading processing is completed (YES in step S207), in step S209, the timer is started, and the writing in the short unit is executed in the processing in steps S208, S210, and S211. Then, in response to the lapse of the predetermined time (two seconds) indicated by the timer (YES in step S214), the writing processing in the long writing unit is executed in the processing in steps S201 and S202.

Using FIG. 3A, the case has been described in which no reading processing is requested from the start of the timer in step S209 through the lapse of the predetermined time. Using FIG. 3B, the case will be described in which reading processing is requested again before the lapse of the predetermined time.

The timing chart in FIG. 3B will be described.

First, if the CPU 108 starts the writing processing in step S407, the writing processing in the long unit is executed in steps S201 and S202. Then, if reading processing is requested before the completion of the writing processing (YES in step S204), the reading processing is started. When the reading processing is started, in step S205, the writing processing is prohibited and suspended, and the reading processing is executed in step S206. If the reading processing is completed (YES in step S207), in step S209, the timer is started, and the writing in the short unit is executed in the processing in steps S208, S210, and S211. Then, if reading processing is requested again before the lapse of the predetermined time (two seconds) indicated by the timer (YES in step S213), the reading processing is started. When the reading processing is started, in step S205, the writing processing is prohibited and suspended, and the reading processing is executed in step S206. If the reading processing is completed (YES in step S207), in step S209, the timer is started, and the writing in the short unit is executed in the processing in steps S208, S210, and S211. Then, in response to the lapse of the predetermined time (two seconds) indicated by the timer (YES in step S214), the writing processing in the long writing unit is executed in the processing in steps S201 and S202.

As described above, according to the present exemplary embodiment, when the writing processing is started after the completion of the reading processing, the writing processing in the short unit is executed until the predetermined time elapses instead of immediately shifting to the writing processing in the long writing unit. If a user operation requests reading operation again, this enables the reading processing to start immediately without waiting for a period until the long writing processing is completed.

Continuous image switching operations performed by a user in particular delays reading start timings, having a significant adverse effect on comfort. In contrast, the image capturing apparatus 100 according to the present exemplary embodiment sets the writing unit smaller during a predetermined period and thus can shorten a waiting time until the start of reading, improving the responsiveness even with continuous reading requests that ensue.

Further, the image capturing apparatus 100 according to the present exemplary embodiment provides higher speed writing processing performed in a long unit during a predetermined period of no operation of a reading request by the user besides a predetermined period of short unit writing processing being performed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-072881, filed Apr. 15, 2020, which is hereby incorporated by reference herein in its entirety.

What is claimed is:

1. An apparatus comprising:
at least one processor; and
a memory coupled to the at least one processor, the memory having instructions that, when executed by the processor, performs operations as:
a first writing unit configured to write data to a recording medium in a first unit;
a second writing unit configured to write data to the recording medium in a second unit smaller than the first unit;
a reading unit configured to read data from the recording medium; and
a control unit configured to perform control, in response to an instruction of reading data from the recording medium during writing data by the first writing unit, to stop writing data by the first writing unit, and then to read data from the recording medium by the reading unit, and, in response to completion of reading data from the recording medium, to write data in the second unit by the second writing unit.

2. The apparatus according to claim 1, wherein, in response to an instruction of reading data from the recording medium during writing data in the first unit by the first writing unit, the control unit performs control to stop the writing of data by the first writing unit and then to read data from the recording medium in a unit smaller than the first unit by the reading unit.

3. The apparatus according to claim 1, wherein the control unit performs control to write data in the second unit by the second writing unit for a predetermined period after completion of reading data from the recording medium and then to write data in the first unit by the first writing unit after a lapse of the predetermined period.

4. The apparatus according to claim 1, wherein, in response to an instruction of reading data from the recording medium during writing data by the second writing unit, the control unit performs control to stop writing data by the second writing unit, and to read data from the recording medium by the reading unit, and, in response to completion of reading data from the recording medium, to restart writing data in the second unit by the second writing unit.

5. The apparatus according to claim 4, wherein the control unit performs control to stop writing in the second unit by the second writing unit in response to a lapse of a predetermined time from the restart of writing data in the second unit by the second writing unit and to perform writing of data in the first unit by the first writing unit.

6. The apparatus according to claim 1,
wherein the apparatus is an image capturing apparatus including an image capturing unit,
wherein the apparatus has an image capturing mode in which an image captured by the image capturing unit is written and recorded on the recording medium and a reproduction mode in which an image recorded on the recording medium is read from the recording medium and reproduced, wherein the apparatus further comprises a switching unit configured to switch between the image capturing mode and the reproduction mode in response to an operation by a user, and wherein the switching unit switches to the reproduction mode before completion of recording of an image in the image capturing mode.

7. A method for controlling an apparatus comprising:

performing first writing processing for writing data to a recording medium in a first unit;

performing second writing processing for writing data to the recording medium in a second unit smaller than the first unit; and performing reading processing for reading data from the recording medium, wherein, in response to an instruction of reading data from the recording medium during writing data by the first writing processing, writing data in the first writing processing is stopped, data is read from the recording medium by the reading processing, and, in response to completion of reading data from the recording medium, data is written in the second unit by the second writing processing.

8. The method according to claim 7, further comprising performing, in response to an instruction of reading data from the recording medium during writing data in the first unit, control to stop the writing of data and then reading data from the recording medium in a unit smaller than the first unit.

9. The method according to claim 7, further comprising:

performing control to write data in the second unit for a predetermined period after completion of reading data from the recording medium; and performing write data in the first unit after a lapse of the predetermined period.

10. The method according to claim 7, further comprising: performing, in response to an instruction of reading data from the recording medium during writing data, control to stop writing data;

performing reading read data from the recording medium; and, performing, in response to completion of reading data from the recording medium, restart writing data in the second unit.

11. The method according to claim 10, further comprising:

performing control to stop writing in the second unit in response to a lapse of a predetermined time from the restart of writing data in the second unit; and performing writing of data in the first unit.

12. The method according to claim 7, further comprising switching between an image capturing mode and a reproduction mode in response to an operation by a user, wherein the switching switches to the reproduction mode before completion of recording of an image in the image capturing mode.

13. A non-transitory computer-readable storage medium storing a program for causing a computer to execute a method, the method comprising:

performing first writing processing for writing data to a recording medium in a first unit;

performing second writing processing for writing data to the recording medium in a second unit smaller than the first unit; and performing reading processing for reading data from the recording medium, wherein, in response to an instruction of reading data from the recording medium during writing data by the first writing processing, writing data in the first writing processing is stopped, data is read from the recording medium by the reading processing, and, in response to completion of reading data from the recording medium, data is written in the second unit by the second writing processing.

14. The non-transitory computer-readable storage medium according to claim 13, further comprising performing, in response to an instruction of reading data from the recording medium during writing data in the first unit, control to stop the writing of data and then reading data from the recording medium in a unit smaller than the first unit.

15. The non-transitory computer-readable storage medium according to claim 13, further comprising:

performing control to write data in the second unit for a predetermined period after completion of reading data from the recording medium; and performing write data in the first unit after a lapse of the predetermined period.

16. The non-transitory computer-readable storage medium according to claim 13, further comprising:

performing, in response to an instruction of reading data from the recording medium during writing data, control to stop writing data;

performing reading read data from the recording medium; and performing, in response to completion of reading data from the recording medium, restart writing data in the second unit.

17. The non-transitory computer-readable storage medium according to claim 16, further comprising:

performing control to stop writing in the second unit in response to a lapse of a predetermined time from the restart of writing data in the second unit; and performing writing of data in the first unit.

18. The non-transitory computer-readable storage medium according to claim 13, further comprising switching between an image capturing mode and a reproduction mode in response to an operation by a user, wherein the switching switches to the reproduction mode before completion of recording of an image in the image capturing mode.

* * * * *